(12) United States Patent
Drechsel et al.

(10) Patent No.: US 9,561,467 B2
(45) Date of Patent: Feb. 7, 2017

(54) SYSTEM FOR RECYCLING OF COOLING DEVICES

(71) Applicants: BHS-SONTHOFEN GMBH, Sonthofen (DE); SÜLZLE HOLDING GMBH & CO. KG, Rosenfeld (DE)

(72) Inventors: Christopher Drechsel, Blaichach (DE); Jürgen Schmid, Rottweil (DE)

(73) Assignees: BHS-SONTHOFEN GMBH, Sonthofen (DE); SULZLE HOLDING GMBH & CO. KG, Rosenfeld (DE)

( * ) Notice: Subject to any disclaimer, the term of this patent is extended or adjusted under 35 U.S.C. 154(b) by 0 days.

(21) Appl. No.: 14/653,373

(22) PCT Filed: Nov. 5, 2013

(86) PCT No.: PCT/EP2013/073000
§ 371 (c)(1),
(2) Date: Jun. 18, 2015

(87) PCT Pub. No.: WO2014/095149
PCT Pub. Date: Jun. 26, 2014

(65) Prior Publication Data
US 2015/0343377 A1 Dec. 3, 2015

(30) Foreign Application Priority Data
Dec. 18, 2012 (DE) .................. 10 2012 223 636

(51) Int. Cl.
*B01F 7/00* (2006.01)
*B01F 7/02* (2006.01)
(Continued)

(52) U.S. Cl.
CPC ............ *B01D 53/864* (2013.01); *B01D 53/75* (2013.01); *B01D 53/8662* (2013.01); *B09B 3/00* (2013.01);
(Continued)

(58) Field of Classification Search
CPC ............... H01F 7/06; H01F 7/08; H01F 7/18; H01F 7/1805; H01F 7/1827; H01F 7/1833; F02M 51/06; F02M 51/061–51/0621; F02M 51/0625; F02M 51/0664; F02M 51/0671; F02D 41/20; F02D 2041/2068; F02D 2041/2079; B01J 19/00; B01J 19/24; B01J 2219/24
See application file for complete search history.

(56) References Cited

FOREIGN PATENT DOCUMENTS

DE 195 48 382 A1 7/1996
DE 697 07 033 T2 2/2002
(Continued)

OTHER PUBLICATIONS

Machine translation of JP 10-323658 A, provided in IDS filed Jun. 18, 2015 and published on Dec. 8, 1998.*
(Continued)

*Primary Examiner* — Natasha Young
(74) *Attorney, Agent, or Firm* — Squire Patton Boggs (US) LLP

(57) ABSTRACT

A system for recycling cooling devices, comprising a system part for catalytically oxidizing the pure hydrocarbon compounds and chlorofluorocarbons which accumulate during the recycling of the cooling devices. According to the invention, this system part comprises two reactors, provided mutually separated in the flow direction of the gases to be treated, a first reactor being used for catalytically oxidizing the pure hydrocarbon compounds while a second reactor is used for catalytically oxidizing chlorofluorocarbons.

19 Claims, 7 Drawing Sheets

(51) Int. Cl.
  *B01F 7/06* (2006.01)
  *B01F 7/08* (2006.01)
  *B01F 7/18* (2006.01)
  *B01J 19/00* (2006.01)
  *B01J 19/24* (2006.01)
  *B01D 53/86* (2006.01)
  *B09B 3/00* (2006.01)
  *B01D 53/75* (2006.01)
  *F02D 41/00* (2006.01)
  *F02D 41/20* (2006.01)
  *F02M 51/00* (2006.01)
  *F02M 51/06* (2006.01)
  *B01D 53/14* (2006.01)

(52) U.S. Cl.
  CPC ......... *B09B 3/0058* (2013.01); *B01D 53/1406* (2013.01); *B01D 53/8668* (2013.01); *B01D 2251/304* (2013.01); *B01D 2255/10* (2013.01); *B01D 2255/40* (2013.01); *B01D 2257/2025* (2013.01); *B01D 2257/2027* (2013.01); *B01D 2257/2045* (2013.01); *B01D 2257/2047* (2013.01); *B01D 2257/2064* (2013.01); *B01D 2257/2066* (2013.01); *B01D 2257/504* (2013.01); *B01D 2257/702* (2013.01); *Y02W 30/20* (2015.05)

(56) References Cited

FOREIGN PATENT DOCUMENTS

| | | |
|---|---|---|
| DE | 10 2010 030 544 A | 12/2011 |
| EP | 0308789 A2 | 3/1989 |
| EP | 0 407 210 A1 | 1/1991 |
| EP | 0 748 649 A1 | 12/1996 |
| JP | 10 323658 A | 12/1998 |
| JP | 2005-098599 A | 4/2005 |
| JP | 2005-152701 A | 6/2005 |
| WO | WO 2004/024331 A1 | 3/2004 |
| WO | WO 2004/052513 A1 | 6/2004 |

OTHER PUBLICATIONS

International Search Report dated Jan. 31, 2014 corresponding to International Patent Application No. PCT/EP2013/073000.
German Search Report dated Jul. 30, 2013 corresponding to German Patent Application No. 10 2012 223 636.8.

* cited by examiner

SYSTEM FOR RECYCLING OF COOLING DEVICES

CROSS-REFERENCE TO RELATED APPLICATION

The present application is a National Stage Application of PCT International Application No. PCT/EP2013/073000, now WO 2014/095149, filed on Nov. 5, 2013, which claims priority to German Patent Application No. DE102012223636.8 filed on Dec. 18, 2012. The entire content of all of the above applications is hereby incorporated by reference.

The invention relates quite generally to particular aspects which are to be taken into account in a system for recycling cooling devices, for example refrigerators, freezers and the like. In particular the process gases released in a system of this type are an important constraint.

Previously, chlorofluorocarbons (CFCs) were predominantly used as coolants in cooling devices, but also as the propellants for foaming the insulating foams in casing walls of the cooling devices, for example R11 and R12, which are known to be harmful to the environment because they in particular damage the ozone layer. Release of CFCs during the recycling of cooling devices therefore cannot be tolerated. In particular, the Technical Instructions on Air Quality Control (TA Luft) should be taken into account, and prescribe not only a CFC concentration of at most 20 mg/m$^3$, but also additionally a maximum CFC mass flow of 10 g/h, for the gases emitted from the system. In particular adhering to the second of these thresholds is a challenge for systems having a throughput of more than one cooling device per minute.

Subsequently, CFCs were replaced with pure hydrocarbon compounds, for example cyclopentane and isobutane. However, these pure hydrocarbon compounds have the drawback that they are explosive above a particular concentration in air. Thus, for example, cyclopentane is explosive in air at a concentration of more than 41 g/m$^3$ (LEL—lower explosive limit). Since for economic reasons both older and newer cooling devices have to be recycled in the same device, the risk of explosion due to the accumulation of pure hydrocarbon compounds is a further challenge. Providing a solution to this challenge formed the subject matter of DE 10 2010 030 544 A1.

The underlying construction of a system for recycling cooling devices comprises a first system part in which the cooling devices are disassembled in advance, a second system part in which the cooling devices are crushed, and a third system part in which the occurring waste gases are purified. In the first system part, the coolant is in particular also removed from the cooling devices, for example by suction. In the second system part, the insulating foams of the casing walls of the cooling devices are in particular also treated, in other words the propellant used for foaming is extracted therefrom. Further, in the third system part, the CFCs and/or the pure hydrocarbon compounds are initially catalytically oxidised, and subsequently the waste gas is purified of the resulting oxidation products. Subsequently, the purified gas is emitted into the external environment.

At this point, it should further be noted that, generally speaking, the compounds denoted herein as R11 and R12 are included in the hydrochlorofluorocarbons in general usage, even though the molecules do not actually contain any hydrogen atoms.

In detail, the present invention deals with a system part for catalytically oxidising the pure hydrocarbon compounds and chlorofluorocarbons which accumulate during the recycling of the cooling devices. In conventional systems for recycling cooling devices, this system part greatly contributes to the operating costs of the system as a whole, since the waste gas from the first and second system parts has to be heated prior to catalytic oxidation, to ensure that the catalytic oxidation can also take place sufficiently effectively to meet the thresholds set in the TA Luft. The energy required for heating the waste gases is provided for example by combustion of natural gas or electrically.

The object of the present invention is therefore to reduce the operating costs of the system for recycling cooling devices.

This object is achieved according to the invention by a system for recycling cooling devices comprising a system part for catalytically oxidising the pure hydrocarbon compounds and chlorofluorocarbons which accumulate during the recycling of the cooling devices, in which this system part comprises two reactors, provided mutually separated in the flow direction of the gases to be treated, a first reactor being used for catalytically oxidising the pure hydrocarbon compounds whilst a second reactor is used for catalytically oxidising chlorofluorocarbons. The catalyst in the first reactor may be a catalyst doped with precious metal, whilst the catalyst in the second reactor may be a mixed oxide catalyst.

The invention exploits the fact that the catalytic oxidation of the pure hydrocarbon compounds in the first reactor is exothermic, and thus heats the gases to be treated, in such a way that they only require slight further heating, if any, to ensure that the subsequent catalytic oxidation of the CFCs in the second reactor is sufficiently effective for the thresholds set in the TA Luft to be met. As a result of the two-stage catalytic oxidation in two mutually separated reactors, which are preferably accommodated in two housings arranged spaced apart, the first reactor, in which the pure hydrocarbons are catalytically oxidised, can in effect be used as a preheater for the second reactor. As a result, the gases require less heating before they enter the second reactor. This reduces not only the energy requirement but also the operating costs of the system according to the invention.

If the concentration of the pure hydrocarbon compounds in the gases to be treated is sufficiently low that the catalytic oxidation in the first reactor cannot heat them sufficiently, a gas heating device, for example operable by electrical current, may be arranged between the first reactor and the second reactor in the flow direction of the gases. By loading the system with a sufficient number of newer cooling devices, in other words cooling devices in which pure hydrocarbon compounds have been used as propellants and/or coolants, the staff operating the system can ensure that this situation never or rarely occurs.

The gas heating device arranged between the first reactor and the second reactor in the flow direction of the gases may for example be operable as a function of a temperature signal detected by a temperature sensor, which is arranged between the gas heating device and the second reactor, preferably adjacent to the input end of the second reactor.

In addition or alternatively, a further temperature sensor may be provided in the second reactor at each of at least two, preferably at least three points arranged mutually separated in the flow direction of the gases. These at least two, preferably at least three further temperature sensors can detect the spatial temperature profile, but also the temperature progression over time in the second reactor. This makes it possible to detect critical situations in good time and to intervene in the control system of the gas heating device so as to prevent overheating of the second reactor.

A gas heating device may also be arranged upstream from the first reactor, for example a burner, preferably powered by natural gas or the like. As a result of the further gas heating device, it can be ensured that the catalytic oxidation in the first reactor is also effective.

The further gas heating device, arranged upstream from the first reactor in the flow direction of the gases, may for example be operable as a function of a temperature signal detected by a temperature sensor, which is arranged between the further gas heating device and the first reactor, preferably adjacent to the input end of the first reactor.

In addition or alternatively, a further temperature sensor may be provided in the first reactor at each of at least two, preferably at least three points arranged mutually separated in the flow direction of the gases. These at least two, preferably at least three further temperature sensors can detect the spatial temperature profile, but also the temperature progression over time in the first reactor. This makes it possible to detect critical situations in good time and to intervene in the control system of the further gas heating device so as to prevent overheating of the first reactor or the gases emitted from the first reactor to the second reactor.

So as to be able to restrict the operation of the further gas heating device to an absolutely necessary level, it is advantageous if a heat exchanger, for example a shell and tube heat exchanger, in which the as yet untreated gases are guided counter to the flow of the treated gases exiting the second reactor, is arranged upstream from the first reactor in the flow direction of the as yet untreated gases. Since the gases exiting the second reactor have to be cooled in any case, before being supplied to the further system part in which they are purified of the oxidation products, the heat energy of the gases exiting the second reactor can advantageously be used to preheat the as yet untreated gases before they enter the first reactor.

The use of the heat exchanger may even result in neither the further gas heating device arranged upstream from the first reactor nor the gas heating device arranged between the first reactor and the second reactor having to be operated, in such a way that the catalytic oxidation is fully self-sufficient in terms of energy. This represents the ideal situation for the operator of the system for recycling cooling devices, since in this case no energy costs are accrued, at least for these system parts.

If the as yet untreated gases are to have a sufficiently high concentration of pure hydrocarbon compounds that there is a risk of the gas temperature at the output end of the first reactor being too high, even though the gas heating device upstream from the first reactor has been taken out of operation, it may be advantageous if the heat exchanger is assigned a bypass line which bridges it, in other words guides the gas flow past the heat exchanger. As a result of this bypass line, cool gas can be mixed into the gas exiting the heat exchanger. The mixing ratio and thus the resulting gas temperature can be set by actuating a valve arranged in the bypass line and having a variable degree of opening. Preferably, the degree of opening of the valve can be adjusted as a function of a temperature signal provided by a temperature sensor, which is arranged between the heat exchanger and the first reactor in the flow direction of the as yet untreated gases.

As stated previously, the system may further comprise a system part which is upstream from the system part for catalytically oxidising the pure hydrocarbon compounds and chlorofluorocarbons which accumulate during the recycling of the cooling devices, and in which the coolant containing pure hydrocarbon compounds and/or chlorofluorocarbons is extracted from the cooling devices. This system part may for example comprise a suction device by means of which the coolant is extracted from the cooling devices. The extracted coolant is supplied to the system part for catalytically oxidising the pure hydrocarbon compounds and chlorofluorocarbons which accumulate during the recycling of the cooling devices. In addition, it may comprise a system part which comprises a crushing device, in which the cooling devices are crushed, and a gas extraction device, in which the pure hydrocarbon compounds and/or chlorofluorocarbons used as propellants are extracted from the insulating foam of the cooling devices which accumulates during the crushing, the pure hydrocarbon compounds and chlorofluorocarbons which are separated off in the gas extraction device being supplied to the system part for catalytic oxidation.

In the following, the invention is described in greater detail by way of an embodiment, with reference to the accompanying drawings, in which.

Figure 1:
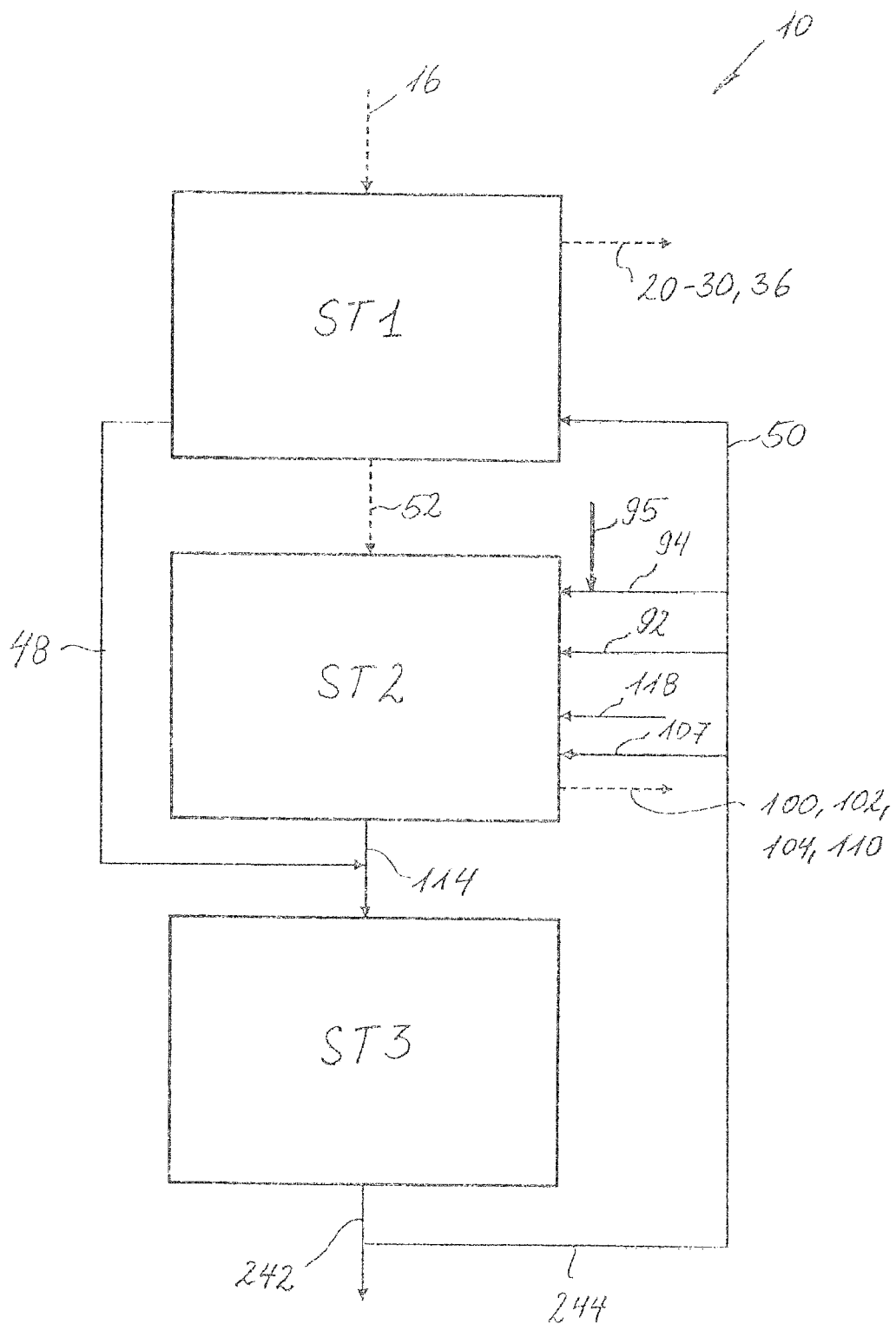
FIG. 1 is a highly schematic drawing of the system according to the invention for recycling cooling devices, along with the three steps ST1, ST2 and ST3 thereof.

In FIG. 1, a system according to the invention for recycling cooling devices, for example refrigerators, is denoted as a whole as 10. The system is basically subdivided into three steps, which are shown highly schematically in FIG. 1. In the first step ST1, the cooling devices are disassembled in advance, in the second step ST2 they are crushed, and in the third step ST3 the waste gas which accumulated in steps ST1 and ST2 is purified of environmentally harmful and dangerous constituents.

As is known, in particular older cooling devices comprise chlorofluorocarbons (CFCs), for example R11 and/or R12, as coolants. CFCs are also predominantly used for foaming the polyurethane foam used as an insulating material. In modern cooling devices, by contrast, pure hydrocarbon compounds, for example cyclopentane and/or isobutane, can be used both as coolants and as foaming agents. Particular attention must be paid to both classes of substance during the recycling of cooling devices, the CFCs in particular because they are harmful to the environment, and cyclopentane and isobutane in particular because of the risk of explosion attributable thereto. As regards the CFCs, the Technical Instructions on Air Quality Control (TA Luft) should further be taken into account, and prescribe a CFC concentration of at most 20 mg/m$^3$ and a maximum mass flow of 10 g/h for the gases emitted from the system.

A further relevant aspect for the operator of the system 10 is the energy requirement of the system, in particular in relation to the consumption of natural gas. This will be discussed in greater detail in the following.

In relation to both aspects, specifically adherence to the TA Luft and consumption of natural gas, the system according to the invention for recycling cooling devices has major advantages over prior art systems.

The three steps ST1, ST2 and ST3 are described in greater detail in the following with reference to FIGS. 2 to 6.

Figure 2:
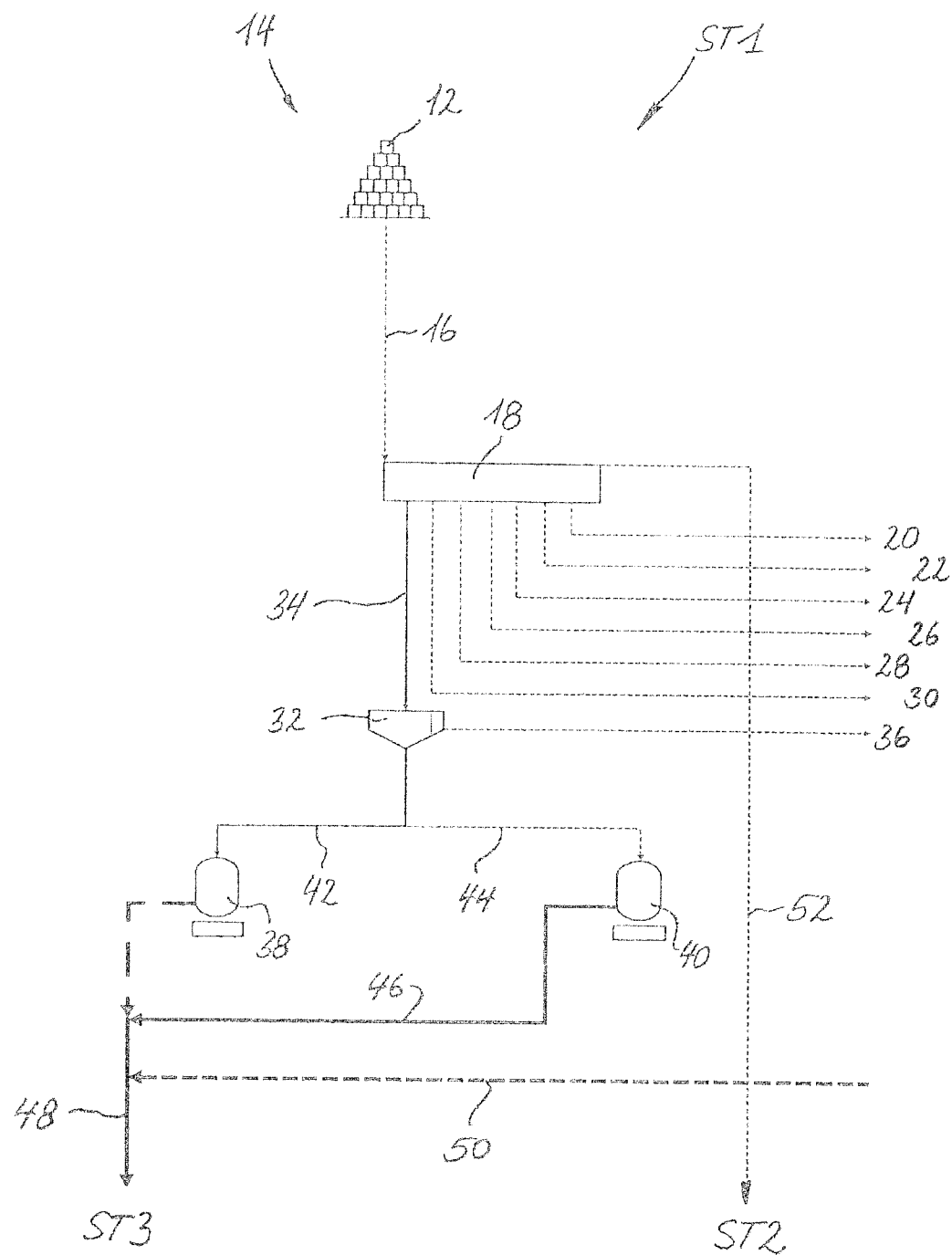
FIG. 2 is a schematic drawing of the advance disassembly step ST1.

In FIG. 2, the cooling devices 12 of the advance disassembly step ST1 are supplied (thin dashed line 16) from a reservoir or store 14. In the advance disassembly step ST1, the cooling devices 12 are subsequently disassembled at 18, for example by hand. In the process, the various substances and components are removed from the cooling devices. Examples include glass, plastic material foils, electrical cables, capacitors, mercury switches, compressors, wood and other waste. These substances and components are ejected from the process separately from one another and collected, as is indicated in FIGS. 1 and 2 by way of example by thin dashed lines 20, 22, 24, 26, 28 and 30.

Further, oil and coolant are sucked out of the cooling devices 12 and passed on (thin solid line 34) to a separation device 32 for further separation. In the separation device 32, the oil and coolant are separated from one another. This may for example take place by thermally venting out the oil, for example at approximately 150° C. with negative pressure. The oil is passed on (thin dashed line 36) to a tank, where it is collected, whilst the coolant is alternately supplied (thin solid and dashed lines 42, 44) to two buffer tanks 38 and 40. One of the buffer tanks 38 or 40 is always connected to the separation device 32, and receives separated coolant, whilst the other buffer tank 40 or 38 emits (solid line 46 in FIGS. 1 and 2) the coolant contained therein to the waste gas purification step ST3 via a line 48.

As an explosion prevention measure, air may be added via a line 50 to the coolant supplied from the buffer tanks 38, 40 to the waste gas purification step ST3, so as to be able to ensure that in particular the concentration of isobutane in the air is less than 8 g/m$^3$, in other words less than 20% of the lower explosive limit (LEL). If the line 48 which guides the coolant to the waste gas purification step ST3 is implemented in a correspondingly explosion-proof manner, this supply of air may also be omitted.

The cooling devices 12 which are disassembled in advance, in other words in particular the housings thereof, are supplied (thin dashed line 52) to the crushing step ST2, which is described in greater detail in the following with reference to FIG. 3.

In the crushing step ST2, the cooling devices 12 are initially supplied to a crushing device 54, for example a BHS rotor shredder of the type known from WO 2004/024331 A1. In this crushing device 54, the cooling devices 12 are crushed in a manner known per se. In particular, the polyurethane foam used as an insulation material is also released from the metal or plastics material housing of the cooling devices 12 and crushed. This also leads to the substances used for foaming the polyurethane being released, in particular the aforementioned CFCs and pure hydrocarbon compounds, respectively. For the reasons stated previously, these also have to be supplied to the waste gas purification step ST3.

As is known from DE 10 2010 030 544 A1, the crushing device 54 acts as a fan, which brings about a gas throughput of approximately 25,000 m$^3$/h through the crushing space. Such large amounts of gas are difficult to control in a waste gas purification system. Therefore, DE 10 2010 030 544 A1 proposes passing the gas exiting the output end 54a of the crushing device 54 back to the input end 54b of the crushing device 54 again via a line 56, and thus in a circuit, merely a particular volume flow per unit time, for example less than 6,000 m$^3$/h, being branched off via a line 58 and supplied to the waste gas purification step ST3.

Between the output end 54a of the crushing device 54 and the branch point 60, the gas is further freed from dust, for example using a cyclone separator 62 and a bag filter 64.

Further, a ventilator 66 is also provided in this line portion, and additionally promotes the circulating flow. For the detailed description of this circuit, reference should be made to DE 10 2010 030 544 A1, to the disclosure of which reference is hereby made in this regard.

In the cyclone separator 62 and the bag filter 64, in particular polyurethane dust is removed from the circulating gas. This is supplied (thin dashed lines 70, 72) to a pelleting device 68. It should further be noted that fresh air is supplied to the bag filter 64 via a line 74 so as to clean it.

The crushed material exiting the crushing device 54 is supplied (thin dashed line 78) to a substance separation unit 76. This comprises an air separator 80, in which in particular polyurethane is removed from the crushed material by density separation. The gas flow exiting the output end 80a of the air separator 80 is also guided in the circuit 84 by means of a ventilator 82, in other words passed back to the input end 80b of the air separator 80. Coarser polyurethane portions are separated off from this circuit 84 by means of a cyclone separator 86 and supplied (thin dashed line 88) to the pelleting device 68. By contrast, dust portions remain in the circuit 84. So as to be able to omit a separate bag filter for separating off the dust portions from the air separator circuit 84, approximately 10% of the gas flow guided in the circuit (in other words for example approximately 1,500 m$^3$/h of approximately 15,000 m$^3$/h) is introduced into the circuit 56 of the crushing device 54 via a line 90. In this way, the dust portions can also be captured from the air separator 80 by the bag filter 64. The branched-off gas flow is compensated by supplying fresh air via a line 92.

The difference between the gas flow branched off from the crushing circuit 56 through the line 58 and the gas flow supplied to the crushing circuit 56 from the air separator circuit 84 via the line 90 is supplied to the crushing circuit 56 via a line 94.

The substances exiting the output end 80a of the air separator 80 are subdivided into the portions of ferromagnetic metals, non-ferromagnetic metals and mixed plastics materials in a magnetic separator 96 and a subsequent eddy current separator 98. These substances are ejected from the process separately from one another and collected, as is indicated in FIGS. 1 and 3 by way of the thin dashed lines 100, 102, 104.

As disclosed above, the polyurethane is supplied to the pelleting device 68 at a different consistency. This may range from pure polyurethane dust to coarse chunks of polyurethane foam which still contain foaming agent, in other words CFCs or pure hydrocarbon compounds. In addition, the gas by means of which the polyurethane is supplied to the pelleting device 68 also contains foaming agent which has exited the polyurethane foam as a result of the crushing. Therefore, so as be able to prevent any risk of explosion, nitrogen gas is supplied to the pelleting device 68 via a line 106, and is provided for example by a nitrogen supply unit 108.

Figure 3:
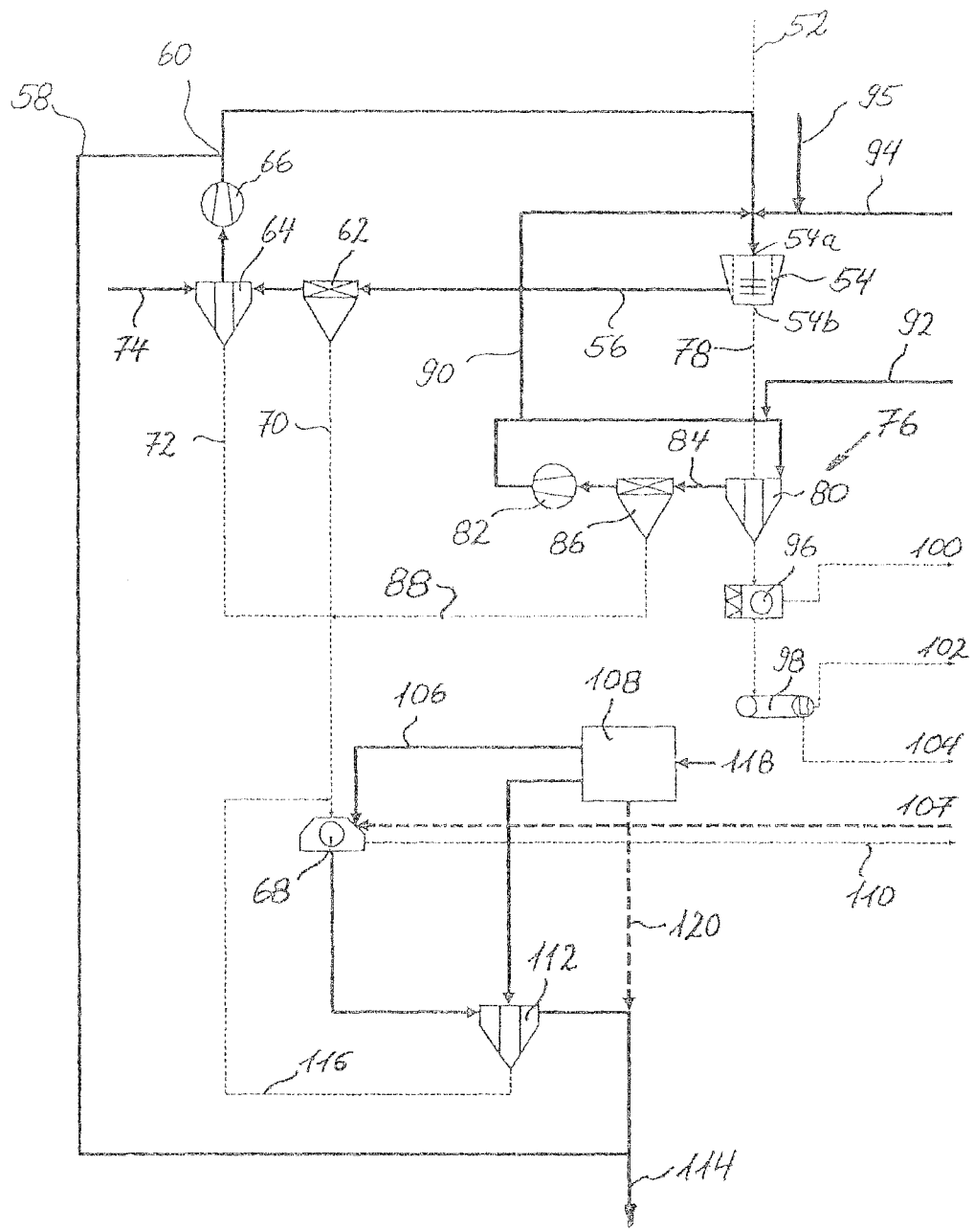
FIG. 3 is a schematic drawing of the crushing step ST2.

As an alternative the supply of nitrogen gas, the pelleting device 68 may be supplied with air, heated to 100° C. to 120° C., via a line 107, indicated as a thick dashed arrow in FIG. 3. This measure can also ensure that the concentration of pure hydrocarbon compounds in the pelleting device 68 can be kept below approximately 20% of the lower explosive limit. The temperature of 100° C. to 120° C. is necessary so as to be able to ensure complete removal of gas from the polyurethane foam. As a result of this measure, the nitrogen supply unit 108 could be omitted, and this would have an advantageous effect on the investment and operating costs.

The polyurethane pellets produced in the pelleting device 68 are ejected from the process and collected separately, as is indicated in FIGS. 1 and 3 by a thin dashed line 110.

The gas flow exiting the pelleting device 68 is purified in a bag filter 112 and subsequently supplied to the waste gas purification step ST3 via the line 114. The bag filter 112 is cleaned using nitrogen gas, which also comes from the nitrogen supply unit 108, and the collected dust is supplied to the pelleting device 68 again (thin dashed line 116).

The centrepiece of the nitrogen supply unit 108, which is known per se, is formed by an air decomposition device. In this air decomposition device, the nitrogen gas is separated off from the fresh air supplied via the line 118, for example by the PSA (pressure swing adsorption) method, which is known per se, and buffered in a pressure tank or emitted therefrom into the above-disclosed process. The air exiting the air decomposition device has an increased oxygen content and may either be emitted into the environment again in its entirety or be supplied at least in part to the waste gas purification stage ST3, this being shown by a dashed line 120 in FIG. 3.

The line 48 coming from the advance disassembly step ST1 also opens into the line 114 leading to the waste gas purification step ST3 (see FIG. 1).

Figure 4:
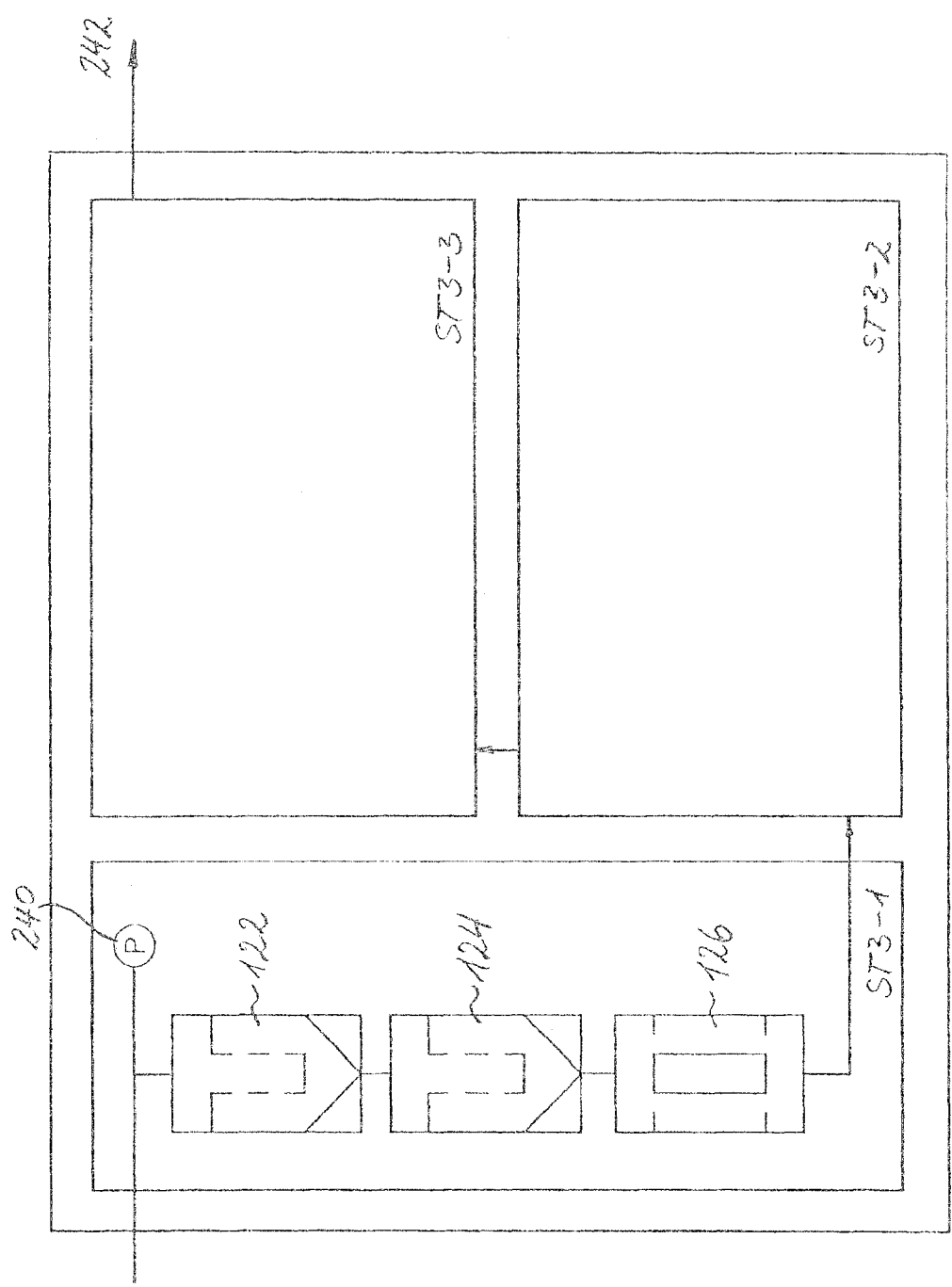
FIG. 4 is a schematic drawing of the waste gas purification step ST3, along with the sub-steps ST3-1, ST3-2 and ST3-3 thereof.

As is shown in FIG. 4, as well as an advance purification step ST3-1 the waste gas purification step ST3 further comprises a catalysis step ST3-2 and a final purification step ST3-3.

In the advance purification step ST3-1, the gas to be treated is initially filtered again. Coarser particles are initially captured in a first dust filter 122, and finer particles are subsequently captured in a second dust filter 124. Finally, an activated carbon filter 126 is further provided, which holds back aerosols, for example compressor oil mist.

Figure 5:
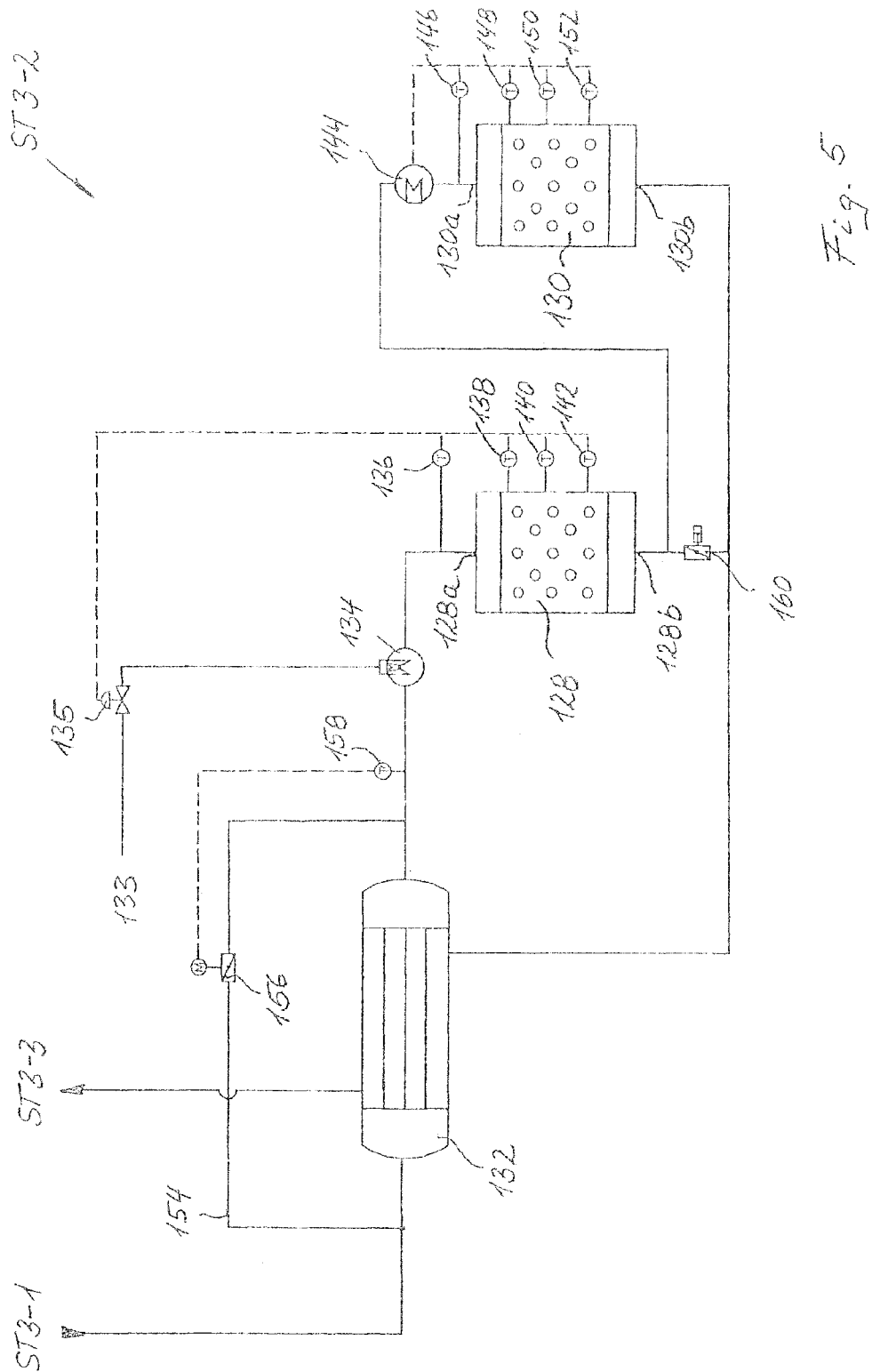
FIG. 5 is a schematic drawing of the catalysis step ST3-2.

According to FIG. 5, the catalysis step ST3-2 comprises a first reactor 128, in which cyclopentane and isobutane are catalytically oxidised to form $H_2O$ and $CO_2$, and a second reactor 130, in which the CFCs are catalytically oxidised to form HCl, HF and $CO_2$ (and a small amount of $Cl_2$ and $F_2$) by reaction with the $H_2O$ produced in the first reactor.

For linguistic simplicity, only cyclopentane is discussed further in the following. However, the statements on the catalytic oxidation of cyclopentane also apply analogously to the catalytic oxidation of isobutane.

Since the catalytic oxidation of cyclopentane only takes place at the desired effectiveness from a temperature of 420° C. upwards, the gas, which leaves the advance purification step ST3-1 at a temperature of approximately 10 to 30° C., needs to be heated. Two different devices are provided for this purpose:

Initially, the gas is passed through a heat exchanger 132, for example a shell and tube heat exchanger, specifically counter to the flow of the hot gas exiting the second reactor 130, which has a temperature of approximately 540° C. Advantageously, the gas is heated by the heat exchanger 132 to a temperature of approximately 420° C. At this temperature, the catalytic oxidation of cyclopentane in the first reactor 128 takes place more efficiently. However, it must not fall below the light-off temperature of 370° C. for the catalytic oxidation of cyclopentane.

If the desired temperature of 420° C. is not achieved by the heat exchanger 132, for example because while starting the system the gas leaving the second reactor 130 is not yet at the aforementioned 540° C., a burner 134, for example operated using natural gas supplied via a line 133, is further provided. The burner 134 is operated as required as a function of a control signal, which is provided by a temperature sensor 136 arranged at the input end 128*a* of the first reactor 128 and supplied to a regulator valve 135 arranged in the line 133. The lower the temperature detected by the temperature sensor 136, the more strongly the burner 134 is operated.

Since the catalytic oxidation of cyclopentane is exothermic, and the gas is heated by approximately 32 $K/m^3$ per gram of decomposed cyclopentane, the first reactor 128 acts as a reheater, which heats the gas to the temperature of 530° C. required for the catalytic decomposition of the CFCs in the second reactor 130. At normal oxidation efficiency, a cyclopentane concentration of approximately 3.5 $g/m^3$ is required for this purpose. If the gas has a higher cyclopentane concentration, there is the risk of the gas being too strongly heated or of the first reactor 128 overheating. So as to be able to prevent this, further temperature sensors are provided at positions separated from one another in the gas flow direction, three temperature sensors 138, 140, 142 in the embodiment shown, which detect the temperature development in the first reactor 128. If there is the risk of the gas temperature at the output end 128*b* of the first reactor 128 exceeding the desired value of 530° C., an intervention is made in the control system of the burner 134 as a function of the output signal of the temperature sensor 136 and the operation of the burner 134 is reduced or even completely stopped, in such a way that the gas temperature at the output end 128*b* of the first reactor 128 has the desired value of 530° C.

If the temperature of the gas at the output end 128*b* of the first reactor 128 does not have the desired value of 530° C., a reheater 144 is provided, which ensures that the gas at the input end 130*a* of the second reactor 130 has the required value of 530° C. The gas temperature only rises slightly further as a result of the catalytic decomposition of the CFCs, specifically to the aforementioned 540° C.

The operation of the reheater 144 is controlled as a function of a temperature sensor 146 and further temperature sensors 148, 150, 152 assigned to the second reactor 130, specifically analogously to how the operation of the burner 134 is controlled as a function of the temperature sensors 136, 138, 140, 142 assigned to the first reactor 128.

After it has passed through the heat exchanger 132, the temperature of the gas, which was still 540° C. at the output end 130*b* of the second reactor 130, has been reduced to approximately 150° C.

If the gas entering the catalysis step ST3-2 contains so much cyclopentane that there is a risk of the temperature at the output end 128*b* of the first reactor 128 exceeding the desired value of 530° C., even though the burner 134 is not being operated, a bypass line 154 is provided which bridges the heat exchanger and through which the "cold" gas can pass the heat exchanger 132 to reach the first reactor 128. A mixed air regulator valve 156, the degree of opening of which is controlled or regulated as a function of the output signal of a temperature sensor 158 arranged downstream from the heat exchanger 132, is provided in this bypass line 154.

If there are no longer any CFCs in the gas supplied to the catalysis step ST3-2, the gas can be supplied directly to the heat exchanger 132, circumventing the second reactor 130, by switching a flap valve 160 after the first reactor 128. In this case, the temperature of the gas at the output end 128*b* of the first reactor 128 can be raised to 630° C. This makes it possible to work with cyclopentane concentrations of somewhat more than 7 $g/m^3$ (corresponding to approximately 17% of LEL).

If the gas supplied to the catalysis step ST3-2 does not contain any cyclopentane, the gas leaves the first reactor 128 without an increase in temperature, and has to be brought to the required input temperature of 530° C. of the second reactor 130 by the reheater 144.

If the system for recycling cooling devices 12 is operated in such a way that the cyclopentane concentration is always between approximately 3.5 g/m$^3$ and approximately 5.5 g/m$^3$, the system can be operated virtually without an external supply of energy, whether in the form of natural gas to the burner 134 or of current to the reheater 144.

It should further be added that catalysts doped with precious metal may be used for the catalytic oxidation of the pure hydrocarbon compounds in the first reactor 128, whilst mixed oxide catalysts may be used for the catalytic oxidation of the CFCs in the second reactor 130.

Figure 6A:
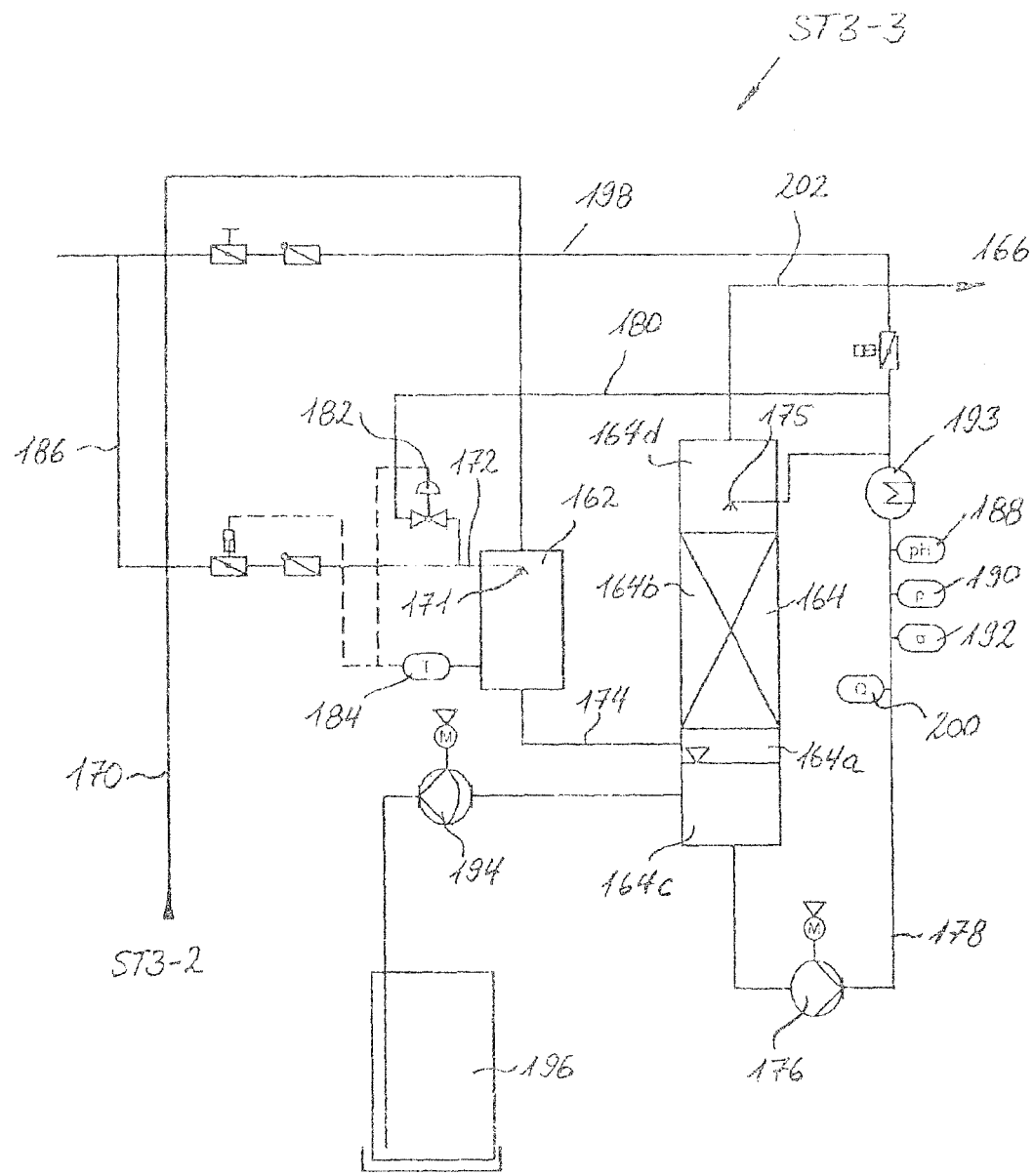
FIGS. 6a and 6b are schematic drawings of the final purification step ST3-3.
Figure 6B:
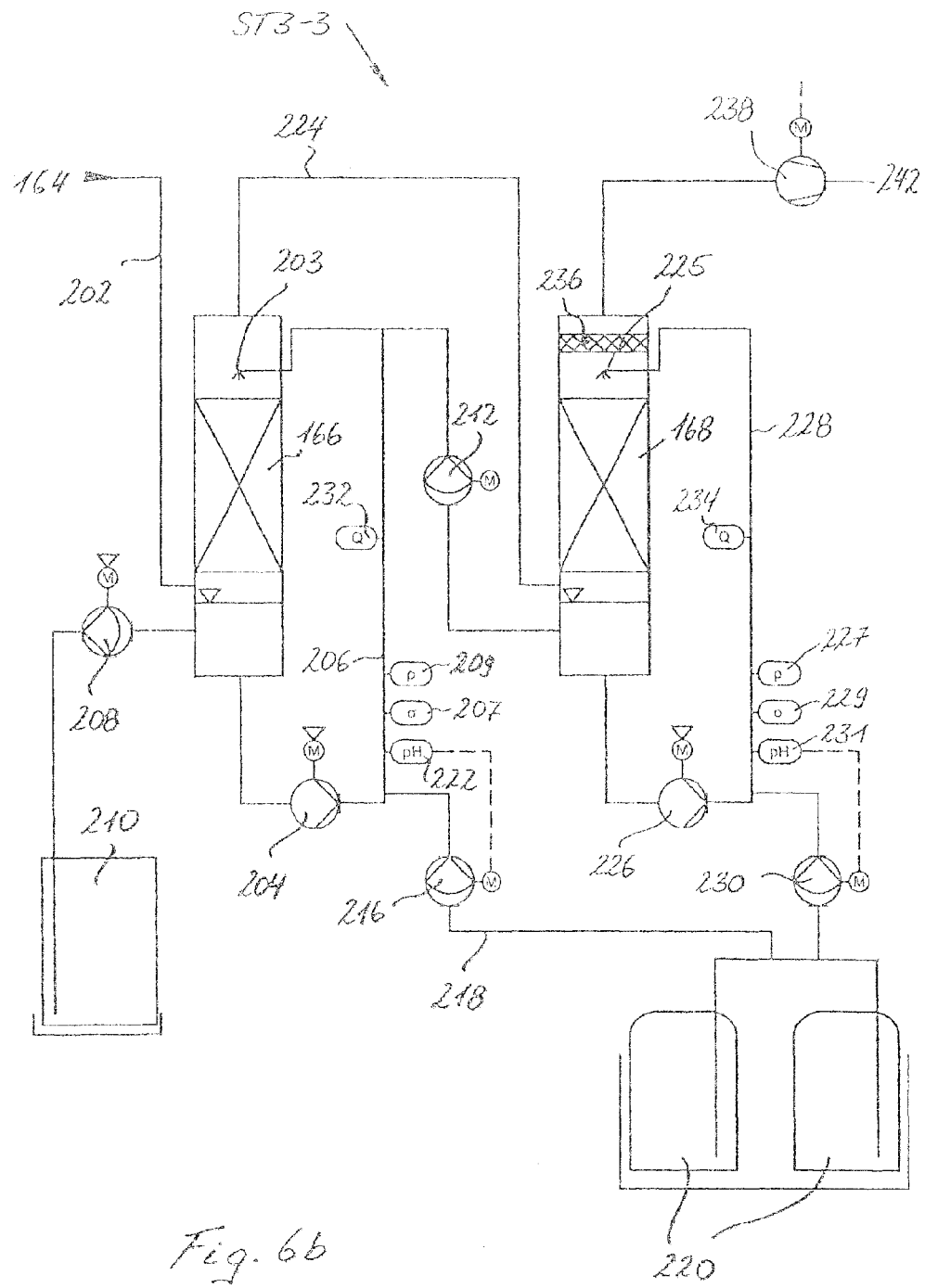

As stated previously, the gas exiting the catalysis step ST3-2 contains H$_2$O, CO$_2$, HCl and HF (and small amounts of Cl$_2$ and F$_2$), and is supplied for final purification to the final purification step ST3-3, the construction and functionality of which are to be described in greater detail in the following with reference to FIGS. 6a and 6b.

As well as a quench 162, in which the gas supplied to the final purification step ST3-3 is cooled, the final purification step ST3-3 comprises as major components a first packed column 164, in which the HCl absorption takes place, and a second packed column 166 and a third packed column 168, in which the chemisorption of hydrogen fluoride HF to sodium fluoride NaF takes place using externally supplied sodium hydroxide solution.

The gas is supplied to the quench 162 via a line 170. In the quench 162, the gas is sprayed by means of a spraying device 171 with liquid, to which it can emit its heat energy, supplied via a line 172. The cooled gas is subsequently passed via a line 174 into the gas chamber 164a of the first packed column 164, where it rises through the solid bed 164b of the packed column 164, being sprayed by means of a spraying device 175 with liquid which is guided by means of a pump 176 from the liquid sump 164c of the packed column 164 through a line 178 to the upper end 164d of the packed column 164

Part of this liquid coming from the sump 164c of the first packed column 164 can also be supplied to the quench 162 via a line 180 and a regulator valve 182. If the temperature, detected by a temperature sensor 184 at the output end of the quench 162 exceeds a predetermined value, externally softened water is supplied to the quench 162 via a line 186. In addition or alternatively, however, the gas may also be cooled downstream from the quench 162 by way of a recuperator (not shown).

In the first packed column 164, but also in the quench 162, HCl is washed out from the gas, in such a way that hydrochloric acid is formed in the sump of the first packed column 164. The concentration of the hydrochloric acid can be determined using a pH sensor 188 and/or a density sensor 190 and/or a conductivity sensor 192, which are arranged in the line 178.

So as to be able to ensure that only HCl, and not HF, is washed out from the gas in the first packed column 164, in other words so as to be able to ensure the purity of the hydrochloric acid formed in the sump 164c of the first packed column 164, it is advantageous to keep the pH detected by the pH sensor 188 at a value lower than the pK$_a$ of hydrogen fluoride, which is approximately 3.14.

If the supply of water via the line 186 would dilute the hydrochloric acid forming in the sump 164c too much, a cooling device 193 may further be provided in the line 178.

If the hydrochloric acid has reached a predetermined concentration, hydrochloric acid is pumped out of the sump 164c of the first packed column 164 in a hydrochloric acid tank 196 by means of a diaphragm pump 194. The removed liquid is replaced with softened water via a line 198. The pump 194 is operated as a function of the throughput through the line 178, detected by a throughput sensor 200, so as to ensure that the gas in the packed column 164 is always sprayed sufficiently with liquid.

The aim of the cooling by way of the quench 162 is to reduce the partial pressure of HCl sufficiently that it is possible to adhere to the TA Luft as a result, or to reduce the residual concentration as much as possible, so as to keep the solution ejected into the tank 196 at as high a concentration as possible.

The gas exiting the upper end 164d of the first packed column 164 is introduced via a line 202 into the gas chamber of the second packed column 166, where it rises through the solid bed of the second packed column 166, being sprayed by means of a spraying device 203 with liquid which is guided by means of a pump 204 from the liquid sump of the second packed column 166 through a line 206 to the upper end of the second packed column 166.

In the second packed column 166, the chemisorption of HF takes place using sodium hydroxide solution in accordance with the equation

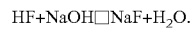

$$HF+NaOH \rightarrow NaF+H_2O.$$

The concentration of the NaF solution can be determined using a pH sensor 222 and/or a density sensor 209 and/or a conductivity sensor 207, which are arranged in the line 206. If the NaF concentration in the sump of the second packed column 166 has reached a predetermined value, part of the liquid is pumped into an NaF tank 210 by means of a diaphragm pump 208. The removed liquid is either replaced with liquid from the sump of the third packed column 168 via the line 214 by means of a diaphragm pump 212 or replaced with sodium hydroxide solution from a tank 220 having, for example, 50% sodium hydroxide solution via the line 218 by means of a diaphragm pump 216, if the pH of the liquid circulating in the line 206, detected by the pH sensor 222, has fallen too far below the target value thereof.

The gas exiting the upper end of the second packed column 166 is introduced via a line 224 into the gas chamber of the third packed column 168, where it rises through the solid bed of the third packed column 168, being sprayed by means of a spraying device 225 with liquid which is guided by means of a pump 226 from the liquid sump of the third packed column 168 through a line 228 to the upper end of the third packed column 168.

Chemisorption of HF also takes place in the third packed column 168 using sodium hydroxide solution. The concentration of the NaF solution can be determined using a pH sensor 231 and/or a density sensor 227 and/or a conductivity sensor 229, which are arranged in the line 228. If the pH in the sump of the third packed column 168 has fallen too far, part of the liquid is pumped into the spray circuit of the second packed column 166 by means of the diaphragm pump 212. The removed liquid is replaced with sodium hydroxide solution from the tank 220 having, for example, 50%, sodium hydroxide solution via the line by means of the diaphragm pump 230.

Both in the spraying circuit of the second packed column 166 and in the spraying circuit of the third packed column 168, throughput sensors 232 and 234 ensure that the pumps 204 and 226 are operated in such a way that the gas in the packed columns 166, 168 is always sprayed sufficiently with liquid.

After passing through the third packed column 168, the gas is completely purified and can be emitted into the external environment via a line 242. So as mostly to prevent the output of aerosols into the external environment, a droplet catcher 236 is provided at the upper end of the third packed column 168.

The above-disclosed construction of the final purification step ST3-3, having a packed column 166 for HCl absorption upstream from the two chemisorption packed columns 166 and 168, has the advantage that the end products captured in the tanks 196 and 210, specifically hydrochloric acid and NaF solution, should have a purity such that they can be used in other branches of industry as raw materials, for example the NaF solution in the production of fluoride toothpaste or for etching purposes in the glass industry after chemical treatment of the NaF solution for example with sulphuric acid. The profit from selling the hydrochloric acid and the NaF solution is favourable for the overall cost-effectiveness of the system 10.

In principle, however, it is also conceivable to omit the upstream HCl absorption. However, the lower investment costs are countered by the fact that the saline solution which forms in the sump of the first of the two remaining packed columns cannot be sold at a profit, but rather has to be disposed of, leading to additional costs.

At this point, it should be noted that instead of the packed columns used in this embodiment, other types of columns could also be used, for example plate columns.

Between the third packed column 168 and the external environment, a ventilator 238 is provided, which draws the gas through the waste gas purification step ST3. Arranging the ventilator 238 at the end of the waste gas purification step has the advantage that there is a negative pressure throughout the waste gas purification step ST3, ensuring that no unpurified waste gas can penetrate into the environment. The operation of the ventilator 238 is controlled as a function of the output signal of a pressure sensor 240, which detects the pressure at the input of the waste gas purification step ST3, in other words directly before the filter 122.

A further aspect of the present invention is that merely a small portion of the gas flow exiting the waste gas purification step ST3 is emitted into the external environment via the line 242. By far the majority, in practice preferably more than 90%, of the gas flow exiting the waste gas purification step ST3 is fed back into the crushing process again to various points in the system 10 via a feedback line 244. The majority of the fed-back air is supplied to the crushing device 54 via the line 94, it also optionally being possible further to introduce fresh air, which is required for oxidising the pure carbon compounds, into the process here via a suction line 95. Another portion may additionally be supplied to the air separator 80 via the line 92. Finally, further portions may also further be fed back into the process via the line 50 and/or the line 107.

As stated previously, if purified gases are fed back to the pelleting device 68 via the line 107 at a temperature of between approximately 100° C. and approximately 120° C., it is possible to omit the nitrogen supply unit 108. So as not to allow the amount of gas guided in the system 10 as a whole to become too large, it is recommended in this case to omit the feedback line 50 and to ensure that the coolant sucked out from the cooling devices 12 is supplied to the waste gas purification step ST3 in an explosion-proof manner by configuring the line 48 in a correspondingly explosion-proof manner.

Since the ratio of the release of pure hydrocarbons in the crushing device 54 on the one hand and in the pelleting device 68 on the other hand may vary over time, for example as a function of the frequency at which newer cooling devices 12 are supplied to the system 10, it is advantageous if the crushing device 54 and the pelleting device 68 each comprise a sensor (not shown) which detects the concentration of pure carbon compounds in the gas. Depending on the detection results from these sensors, a control unit (not shown) can set the degree of opening of flap valves (likewise not shown) in the lines 94 and 107 in such a way that sufficient gas is supplied to each of the crushing device 54 and the pelleting device 68 to ensure that the concentration of the pure hydrocarbons does not exceed a value of 20% of the lower explosion limit (LEL) of the pure hydrocarbon compounds (for example: LEL of cyclopentane=41 g/m$^3$).

Thus, ideally, the system 10 should only be supplied with enough fresh air from the external environment for the gas to contain sufficient oxygen for the catalytic oxidation of the pure hydrocarbon compounds in the reactor 128. This fresh air may for example be supplied to the system via the line 95 and/or the lines which supply the bag filters 64 and 112 with the amount of gas or air required for cleaning them. Accordingly, only this amount of gas should also be emitted to the external environment via the line 242.

This feedback of the gas flow exiting the waste gas purification step ST3 thus has the advantage that not only the maximum CFC concentration of 20 mg/m$^3$ set out in the TA Luft can readily be adhered to, but also the maximum mass flow of 10 g/h likewise set out in the TA Luft.

It should be added that the term "NaF solution", used above for simpler description, does not refer to a solution exclusively of merely NaF. Rather, the solutions may also contain other compounds which are possible in view of the chemistry of Na and F, including $Na_2F_2$ for example.

The invention claimed is:

1. A system for recycling cooling devices, comprising:
   a system part for catalytically oxidising the pure hydrocarbon compounds and chlorofluorocarbons which accumulate during the recycling of the cooling devices, wherein the system part comprises two reactors, provided mutually separated in the flow direction of gases to be treated;
   a first reactor being used for catalytically oxidising the pure hydrocarbon compounds;
   a second reactor is used for catalytically oxidising chlorofluorocarbons; and
   a gas heating device arranged upstream of the first reactor in the flow direction of the gases.

2. The system according to claim 1, wherein the gas heating device is arranged between the first reactor and the second reactor in the flow direction of the gases.

3. The system according to claim 1, further comprising:
   a temperature sensor arranged between the gas heating device and the second reactor, and adjacent to the input end of the second reactor.

4. The system according to claim 1, further comprising:
   a temperature sensor provided in the second reactor at each of at least two points arranged mutually separated in the flow direction of the gases.

5. The system according to claim 1, wherein the gas heating device is powered by natural gas.

6. The system according to claim 1, further comprising:
a temperature sensor arranged between the gas heating device and the first reactor, and adjacent to the input end of the first reactor.

7. The system according to claim 1, further comprising:
a temperature sensor provided in the first reactor at each of at least two, points arranged mutually separated in the flow direction of the gases.

8. The system according to claim 1, wherein the first reactor comprises a catalyst doped with precious metal.

9. The system according to claim 1, wherein the second reactor comprises a mixed oxide catalyst.

10. The system according to claim 1, wherein the system comprises a system part, for extracting coolant comprising pure hydrocarbon compounds or chlorofluorocarbons from the cooling devices, which is upstream from the system part for catalytically oxidising the pure hydrocarbon compounds and chlorofluorocarbons which accumulate during the recycling of the cooling devices.

11. The system according to claim 1, wherein the gas heating device is operable by electrical current.

12. The system according to claim 1, further comprising a temperature sensor that is provided in the first reactor or the second reactor at each of at least three points arranged mutually separated in the flow direction of the gases.

13. The system according to claim 1, wherein the gas heating device is a burner.

14. A system for recycling cooling devices, comprising:
a system part for catalytically oxidising the pure hydrocarbon compounds and chlorofluorocarbons which accumulate during the recycling of the cooling devices, wherein the system part comprises two reactors, provided mutually separated in the flow direction of gases to be treated;
a first reactor being used for catalytically oxidising the pure hydrocarbon compounds;
a second reactor is used for catalytically oxidising chlorofluorocarbons, wherein a heat exchanger, in which the gases which have yet to be treated are guided counter to the flow of the gases which have been treated exiting the second reactor, is arranged upstream from the first reactor in the flow direction of the gases which have yet to be treated.

15. The system according to claim 14, wherein the heat exchanger is assigned a bypass line which bridges the heat exchanger.

16. The system according to claim 15, further comprising a valve, having a variable degree of opening arranged in the bypass line.

17. The system according to claim 16, wherein the degree of opening of the valve is adjusted as a function of a temperature signal provided by a temperature sensor, said temperature sensor being arranged between the heat exchanger and the first reactor in the flow direction of the gases which have yet to be treated.

18. The system according to claim 15, wherein the valve is a flap valve.

19. A system for recycling cooling devices, comprising:
a system part for catalytically oxidising the pure hydrocarbon compounds and chlorofluorocarbons which accumulate during the recycling of the cooling devices, wherein the system part comprises two reactors, provided mutually separated in the flow direction of gases to be treated;
a first reactor being used for catalytically oxidising the pure hydrocarbon compounds;
a second reactor is used for catalytically oxidising chlorofluorocarbons;
a system part which comprises a crushing device, in which the recycling cooling devices are crushed; and
a gas extraction device, in which the pure hydrocarbon compounds or chlorofluorocarbons used as propellants are extracted from the insulating foam of the cooling devices which accumulates during the crushing.

* * * * *